US008532365B2

(12) United States Patent
Tate

(10) Patent No.: US 8,532,365 B2
(45) Date of Patent: Sep. 10, 2013

(54) PATTERN DETECTION APPARATUS, PROCESSING METHOD THEREOF, AND COMPUTER-READABLE STORAGE MEDIUM

(75) Inventor: Shunta Tate, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 314 days.

(21) Appl. No.: 12/876,974

(22) Filed: Sep. 7, 2010

(65) Prior Publication Data

US 2011/0075937 A1 Mar. 31, 2011

(30) Foreign Application Priority Data

Sep. 28, 2009 (JP) ................................. 2009-223461

(51) Int. Cl.
*G06K 9/00* (2006.01)
(52) U.S. Cl.
USPC ............................ 382/149; 382/147; 382/218
(58) Field of Classification Search
USPC .......................................... 382/147, 149, 218
See application file for complete search history.

(56) References Cited

U.S. PATENT DOCUMENTS

| 5,513,275 | A | * | 4/1996 | Khalaj et al. | ................... 382/149 |
| 7,224,829 | B2 | * | 5/2007 | Enokido | ....................... 382/145 |
| 7,366,343 | B2 | * | 4/2008 | Takeuchi | ..................... 382/145 |
| 2006/0072664 | A1 | * | 4/2006 | Kwon et al. | .............. 375/240.16 |
| 2011/0075937 | A1 | * | 3/2011 | Tate | ............................. 382/218 |

FOREIGN PATENT DOCUMENTS

| JP | 7-159344 A | 6/1995 |
| JP | 2002-198406 A | 7/2002 |
| JP | 2004-085503 A | 3/2004 |
| JP | 2004-318488 A | 11/2004 |

OTHER PUBLICATIONS

Japanese Office Action dated Jul. 8, 2013, corresponding to Japanese Patent Application No. 2009-223461.

\* cited by examiner

*Primary Examiner* — Gregory M Desire
(74) *Attorney, Agent, or Firm* — Fitzpatrick, Cella, Harper & Scinto

(57) ABSTRACT

A pattern detection apparatus inputs an image of an object including repetitive patterns, estimates a period of the repetitive patterns in the input object, and generates a reference image based on images divided by the estimated period. Then, the pattern detection apparatus compares the reference image and the image of the object, and detects the positions of individual patterns in the repetitive patterns based on the comparison result.

19 Claims, 17 Drawing Sheets

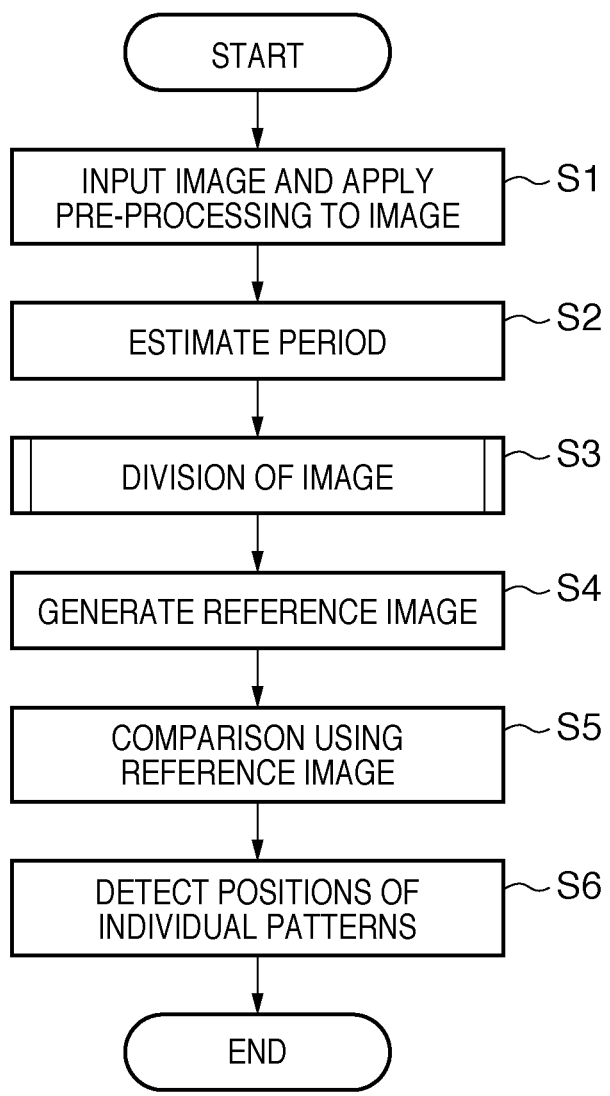

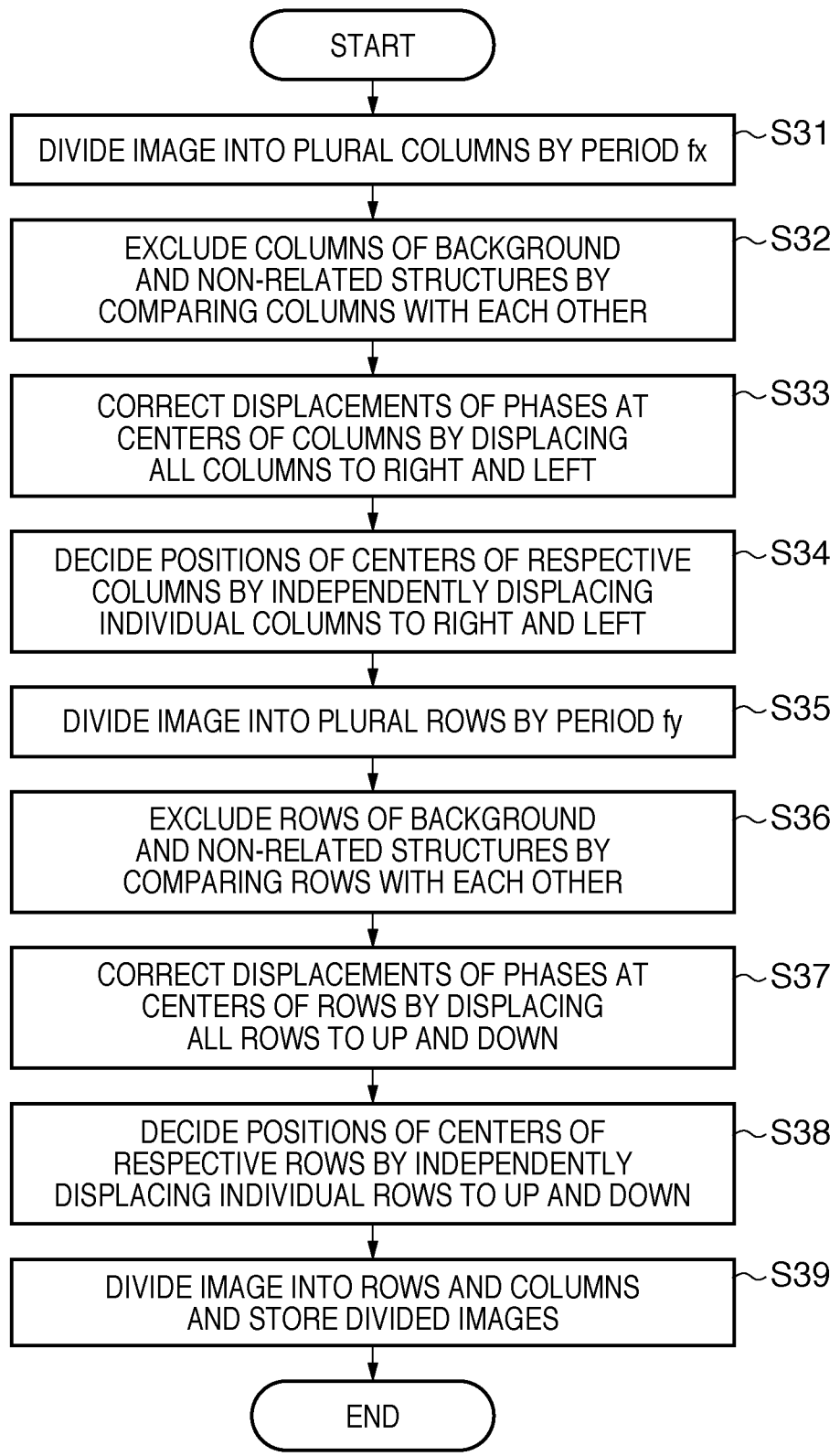

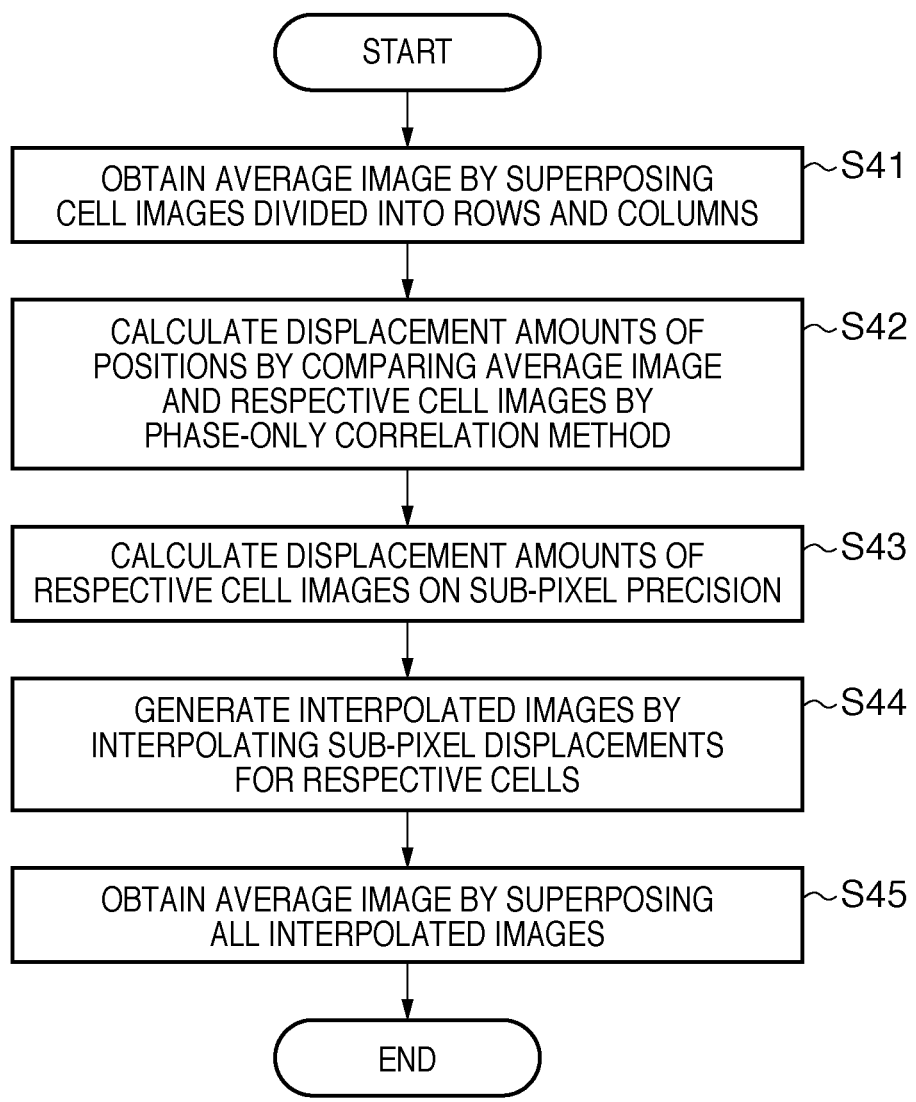

F I G. 10
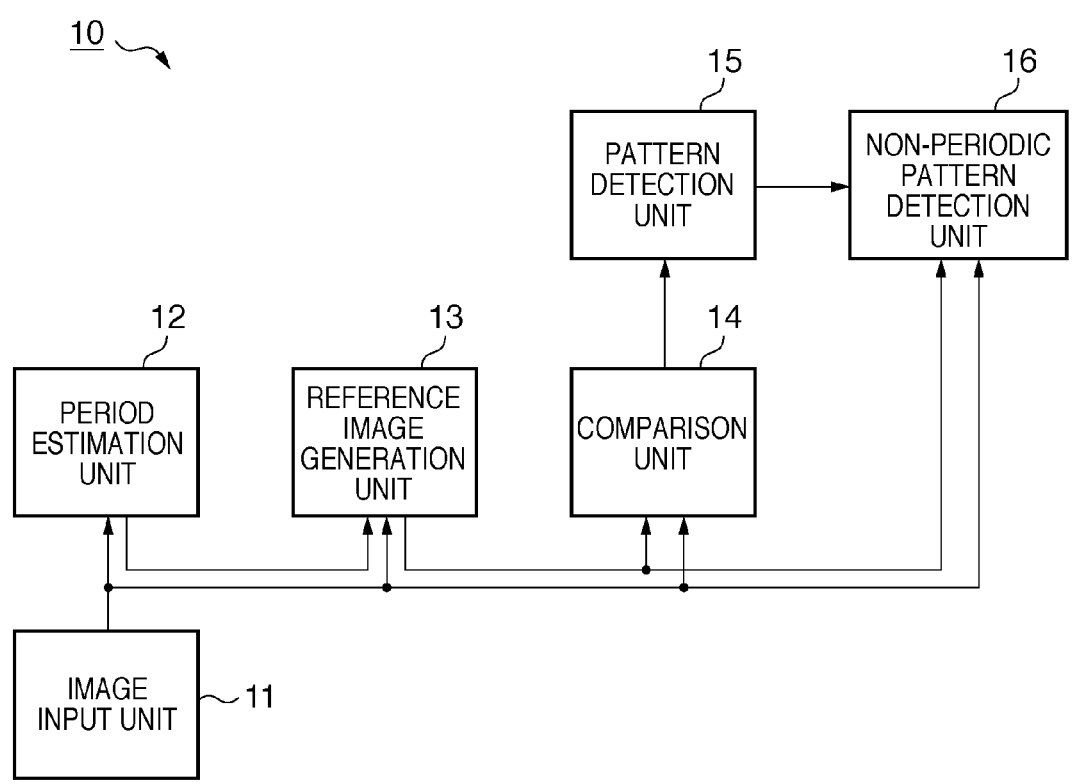

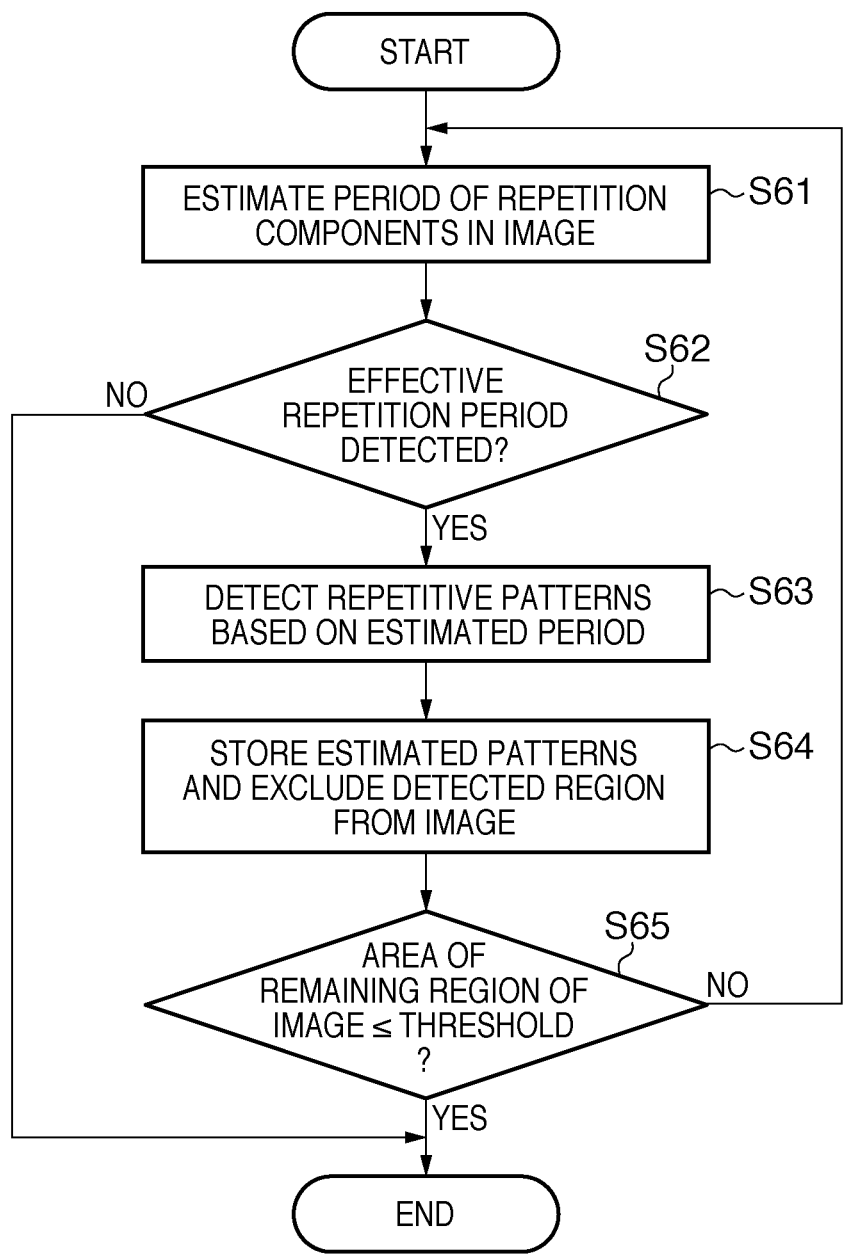

PATTERN DETECTION APPARATUS, PROCESSING METHOD THEREOF, AND COMPUTER-READABLE STORAGE MEDIUM

BACKGROUND OF THE INVENTION

1. Field of the Invention

The present invention relates to a pattern detection apparatus, processing method thereof, and computer-readable storage medium.

2. Description of the Related Art

Assembling or packaging of products includes, for example, a process for storing components or products in small partitions (or slots) of a partitioned tray or a process for picking up components from there. These processes can be automated by image recognition using, for example, a visual sensor and manipulator. When the processes are automated by image recognition, template matching such as a normalized correlation method is executed using the shape of each partition or slot, which is registered in advance, thereby aligning the position of each individual partition. Then, a product is stored in that partition or it is picked up from that partition.

As a subject of image recognition associated with such process, for example, defect inspection for an object having a periodic structure (for example, a substrate component or display panel) is known. In image recognition in such defect inspection, a method of extracting one unit of patterns using the periodicity of the patterns, and comparing it with a reference image, and a method of detecting a defect by comparing extracted patterns with each other is used.

When a periodic component of repetitive patterns is unknown, a method of estimating a period based on a frequency component obtained by Fourier transformation or an autocorrelation function is adopted. A technique described in Japanese Patent Laid-Open No. 07-159344 estimates a period using an autocorrelation function. Then, using a plurality of peaks of the autocorrelation function, which are generated at intervals as integer multiples of a periodic component, repetitive patterns are compared with each other, thereby detecting a defect.

These methods are premised on that repetitive patterns of a target object such as a panel or tray are repeated at a constant period to some extent, and are not largely deviated from that period. In addition, these methods are also premised on that even when a structure which is not related to the repetitive patterns exists, its influence is negligibly small, and the number of repetitions of patterns is sufficiently larger than the number of disturbances.

However, in an actual manufacturing site, such premises are not often satisfied. For example, when manual operations for storing produced components in slots of a tray are replaced by a manipulator, the following disturbance factors often arise:

(1) since the tray is manually formed, the shapes and intervals of individual slots are not accurate;

(2) since the specification of, for example, a tray is not settled, the numbers and shapes of slots are different for respective trays;

(3) the sizes and number of slots are adjusted by screw clamping in correspondence with production adjustment;

(4) the tray is distorted due to aging, low assembling precision, and insufficient rigidity of materials;

(5) structures such as beams used to reinforce the tray, which are not related to the repetitive patterns, exist together; and (6) the number of repetitions of patterns is insufficient for the non-related structures.

Hence, it becomes difficult to estimate the period of the repetitive patterns and to detect the pattern.

In order to exclude such disturbance factors, the tray may be replaced by a high-precision dedicated jig, which is managed using a barcode or RFID tag. In this case, however, high cost is required for storage and management. Also, the dedicated jig has poor flexibility for production adjustment or changes of specifications, and is not suited for low-volume, multiple production. For example, when products are stored in partitions of a cardboard box for packaging, it is not often practical to replace a storage box by another.

In addition, in order to eliminate, for example, distortion caused by aging, a high-rigidity tray (for example, made up of metal) is often used. However, when a component or manipulator contacts the tray during handling of the component, the component or manipulator readily suffers dents or failures.

SUMMARY OF THE INVENTION

The present invention provides a technique which allows to accurately detect positions of individual patterns in repetitive patterns even in an image of an object which includes fluctuations in a period of repetitive patterns or an object which includes disturbances which are not related to the repetitive patterns.

According to a first aspect of the present invention there is provided a pattern detection apparatus comprising: an input unit configured to input an image of an object including repetitive patterns; an estimation unit configured to estimate a period of the repetitive patterns in the object input by the input unit; a generation unit configured to generate a reference image based on images divided by the period estimated by the estimation unit; a comparison unit configured to compare the reference image generated by the generation unit and the image of the object input by the input unit; and a pattern detection unit configured to detect positions of individual patterns in the repetitive patterns based on a comparison result of the comparison unit.

According to a second aspect of the present invention there is provided a processing method of a pattern detection apparatus, comprising: inputting an image of an object including repetitive patterns; estimating a period of the repetitive patterns in the input object; generating a reference image based on images divided by the estimated period; comparing the generated reference image and the image of the input object; and detecting positions of individual patterns in the repetitive patterns based on a result in the comparing.

According to a third aspect of the present invention there is provided a computer-readable storage medium storing a computer program, the program controlling a computer to function as: an input unit configured to input an image of an object including repetitive patterns; an estimation unit configured to estimate a period of the repetitive patterns in the object input by the input unit; a generation unit configured to generate a reference image based on images divided by the period estimated by the estimation unit; a comparison unit configured to compare the reference image generated by the generation unit and the image of the object input by the input unit; and a pattern detection unit configured to detect positions of individual patterns in the repetitive patterns based on a comparison result of the comparison unit.

Further features of the present invention will be apparent from the following description of exemplary embodiments with reference to the attached drawings.

BRIEF DESCRIPTION OF THE DRAWINGS

FIG. 2 is a flowchart showing an example of the sequence of processing in a pattern detection apparatus 10;

FIG. 4 is a flowchart showing an example of the sequence of processing in the pattern detection apparatus 10;

FIG. 5 is a flowchart showing an example of the sequence of processing in the pattern detection apparatus 10;

FIG. 10 is a block diagram showing an example of the functional arrangement of a pattern detection apparatus 10 according to the second embodiment;

FIG. 15 is a flowchart showing an example of the sequence of processing of the modified embodiment.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
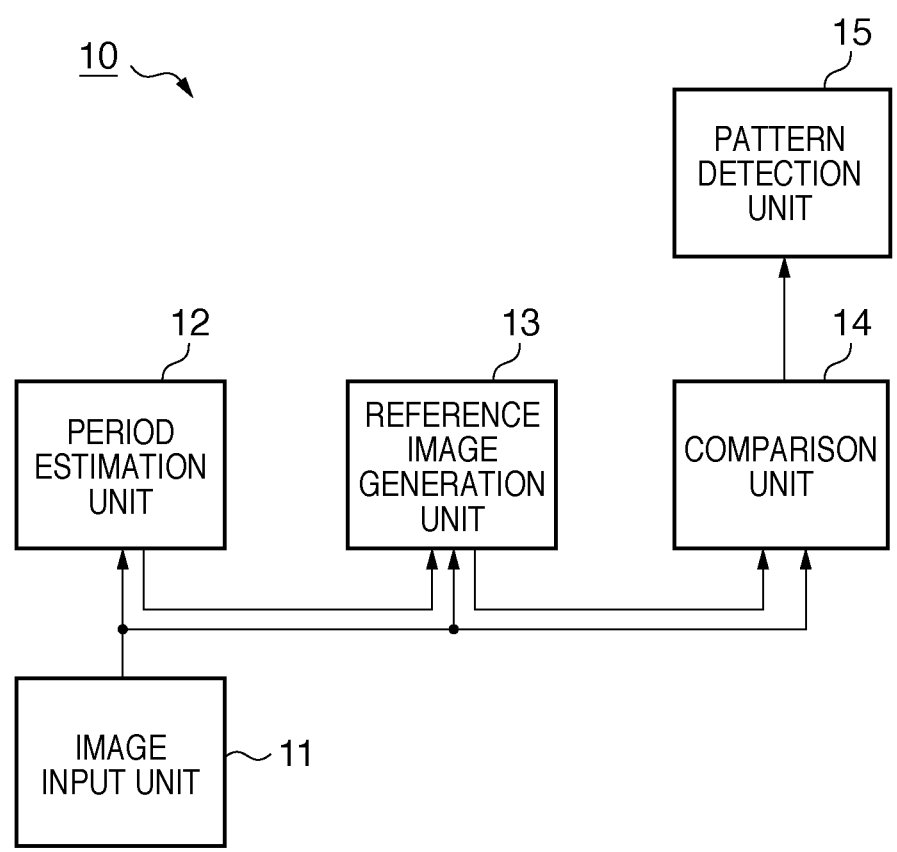
FIG. 1 is a block diagram showing an example of the functional arrangement of a pattern detection apparatus according to one embodiment of the present invention.

FIG. 1 is a block diagram showing an example of the functional arrangement of a pattern detection apparatus according to one embodiment of the present invention.

A computer is built in a pattern detection apparatus 10. The computer includes a main control unit such as a CPU, and storage units such as a ROM (Read Only Memory), a RAM (Random Access Memory), and an HDD (Hard Disk Drive). In addition, the computer includes input/output units such as a keyboard, mouse, display, and buttons or touch panel. These components are connected via, for example, a bus, and are controlled when the main control unit executes programs stored in the storage units.

The pattern detection apparatus 10 includes an image input unit 11, period estimation unit 12, reference image generation unit 13, comparison unit 14, and pattern detection unit 15.

The image input unit 11 inputs an image including an object having repetitive patterns. In an image of the object (object image), repetition periods of the repetitive patterns include at least either of fluctuations or disturbances which are not related to the repetitive patterns. Note that the number of repetitive patterns and a pattern shape are unknown.

The period estimation unit 12 estimates a period of the repetitive patterns from the input object image. The reference image generation unit 13 generates a reference image based on the estimated period. The reference image is an image used as a template required to detect a pattern.

The comparison unit 14 compares the reference image and the object image input by the image input unit 11, and acquires a spatial distribution of degrees of matching with the reference image in association with individual patterns in the repetitive patterns. The pattern detection unit 15 detects the positions of the individual patterns based on the spatial distribution of degrees of matching. The example of the functional arrangement of the pattern detection apparatus 10 has been described.

Figure 3A:
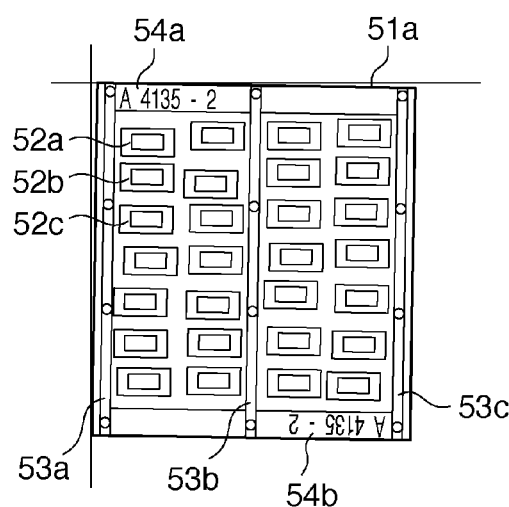
FIGS. 3A to 3H are views showing an example of an overview of pattern detection.

An example of the sequence of processing in the pattern detection apparatus 10 shown in FIG. 1 will be described below with reference to FIG. 2. A case will be exemplified below wherein image recognition (pattern detection) from an object image 51a shown in FIG. 3A is executed. On the object image 51a, repetitive patterns are two-dimensionally arranged. These repetitive patterns are arranged in row and column directions to have certain fluctuations. The repetitive patterns also include disturbances (for example, beam-like structures 53 and engraved marks 54) which are not related to the repetitive patterns.

When this processing starts, the pattern detection apparatus 10 inputs an image using the image input unit 11, and applies pre-processes to the input image (S1). In the pre-processing, for example, general image processing such as normalization of luminance values, gamma correction, and shading correction is executed. Also, in this pre-processing, whether or not the object image has a tilt is checked. If the object image has a tilt, horizontal correction is applied to the object image. That is, when the image has a tilt, such tilt influences the subsequent processing, and is corrected in this step. The tilt correction may use arbitrary techniques, which are not particularly limited. For example, two-dimensional Fourier transformation is executed to acquire a two-dimensional Fourier image F(u, v) from an image f(x, y), and a maximum peak (u*, v*) on a frequency space is calculated. Then, θ=arctan(u*/v*) is calculated, and that value can be used as a tilt of the image. As another method, for example, the two-dimensional Fourier image F(u, v) undergoes polar coordinate transformation to calculate $F^{Pol}(r, \theta)$. Then, logarithmic values of $F^{Pol}$ are added for r to calculate maximum θ* at that time, as given by:

$$\theta^* = \underset{\theta}{\operatorname{argmax}} \sum_r \log|F^{Pol}(r, \theta)| \quad (1)$$

The calculated value may be used as the tilt of the image.

Figure 3C:
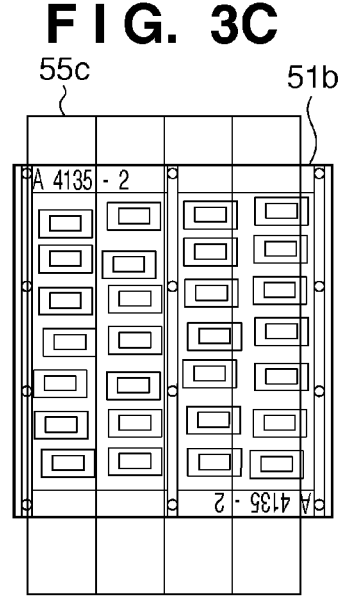
Figure 3B:
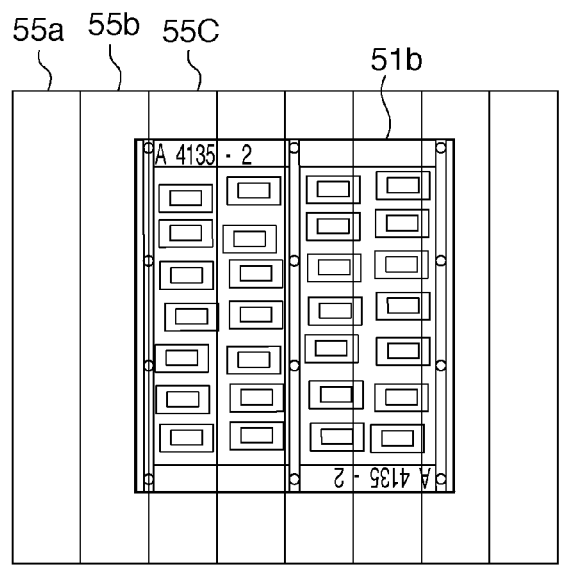

FIG. 3B shows an object image 51b after horizontal correction. Note that in the aforementioned pre-processing, not only the horizontal correction but also another processing may be executed. For example, a parallelogram-like distortion of a pattern array (shear deformation) may be corrected. More specifically, a first peak $\theta^{H*}$ is calculated, and whether or not a second peak $\theta^{V*}$ exists around the first peak $\theta^{H*}+0.5\pi$ is searched. If the peak $\theta^{V*}$ equal to or larger than a predetermined threshold exists, an affine matrix A, which gives a deformation to have the first peak $\theta^{H*}=0°$ and the second peak $\theta^{V*}=90°$, is calculated, thus attaining the horizontal correction and shear deformation correction. For example, when a tray having a grid-like structure is deformed to a parallelogram shape due to aging, directions of a horizontal line segment and oblique line segment can be respectively detected as the first peak $\theta^{H*}$ and second peak $\theta^{V*}$. Based on these detection results, the affine matrix A is calculated to apply correction, thereby correcting the parallelogram shape to a rectangular shape. When any of the above methods is used, a manipulator is instructed by passing values before correction to it using, for example, an inverse affine matrix $A^{-1}$.

Then, the pattern detection apparatus 10 estimates a period of the repetitive patterns using the period estimation unit 12 (S2). In this processing, a scanning range (range) in an x direction, which is used as a detection target of the repetitive patterns, is decided, and a period in the x direction is estimated in this range. Note that the range in the x direction may be decided in advance, or a boundary between a background and object may be detected, and the scanning range may be decided based on the detection result. In the latter method, a luminance difference value (absolute value) along the x direction in an image is referred to, and when the difference value exceeds a predetermined threshold, that position is detected as a boundary. Then, the scanning range in the x direction is defined between boundaries detected in this way. Note that details of the period estimation method will be described later.

After the period is estimated, the pattern detection apparatus 10 divides the repetitive patterns into individual patterns based on the estimated period using the reference image generation unit 13 (S3). Details of division processing into pattern units will be described below using FIG. 4.

When this processing starts, the reference image generation unit 13 calculates a wavelength corresponding to the period estimated in the processing in step S2 described in FIG. 2, and divides the scanning range in the x direction by that wavelength. Then, the object image 51b is divided in the column direction, as denoted by reference numerals 55a to 55c in FIG. 3B (S31). These columns of the image will be referred to as pattern columns hereinafter.

The reference image generation unit 13 deletes pattern columns which include only a background and structures that are not related to the repetitive patterns (S32). This is because the pattern columns which include only a background and structures are not required in detection of the repetitive patterns. Such deletion processing may use any of techniques, which are not particularly limited. For example, a plurality of pattern columns may be added to generate an average image of the pattern columns, and the average image and each pattern column undergo template matching. Then, a pattern column, a similarity of which is lower than a predetermined threshold, may be deleted. Note that as the template matching method, for example, a general normalized correlation method may be used. Alternatively, for example, histograms of luminance distributions of respective pattern columns may be generated, similarities may be calculated based on distances between the histograms, and pattern columns may be deleted according to the calculation results. After the unnecessary pattern columns are deleted in this way, an image shown in FIG. 3C is obtained.

Figure 3D:
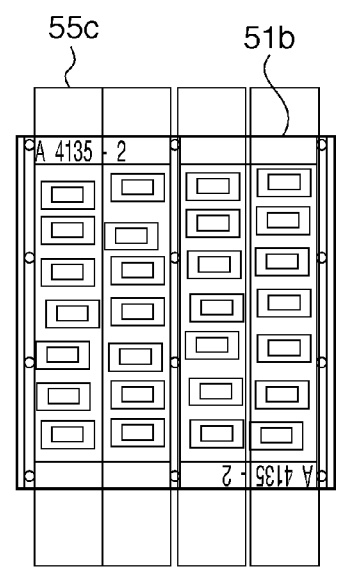

Next, the reference image generation unit 13 corrects the positions of centers of pattern columns (S33). In this correction, for example, (1) all pattern columns are simultaneously displaced to the right and left, and positions that maximize similarities between images of all the pattern columns are searched for. More specifically, the images of all the pattern columns are compared by the normalized correlation method, and positions that maximize a sum total of similarities are searched for. In this case, each pattern column is masked by applying a Gaussian window having a predetermined width. Then, only the centers of the pattern columns are compared. The centers of the pattern columns at that time are defined as temporary central positions. (2) After the temporary central positions are decided, an average image is re-generated. (3) Template matching between the average image and pattern column is individually performed for respective pattern columns. Then, a position that shows a highest degree of matching is determined as the center of each pattern column (S34). As a result, an image shown in FIG. 3D is obtained.

Figure 3E:
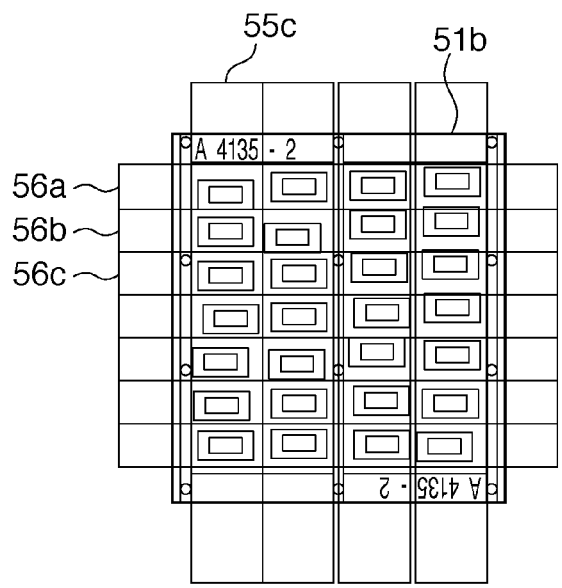

Then, the reference image generation unit 13 executes division in a y direction in the same sequence as that upon division in the x direction, thereby dividing the object image 51b in the row direction. As a result, the object image 51b is divided into a plurality of pattern rows, as shown in FIG. 3E (S35 to S38). With the aforementioned processes, the positions of row and columns are decided, and partitions (cells) at the intersections of the rows and columns are obtained. The image is divided by the cells, and the divided images are stored in, for example, the RAM (S39).

Figure 3G:
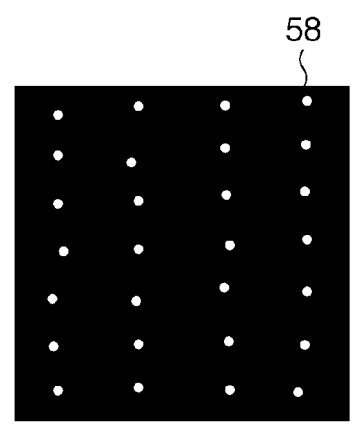
Figure 3F:
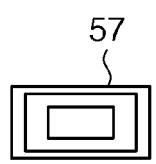

Referring back to FIG. 2, the pattern detection apparatus 10 generates a reference image based on the divided images using the reference image generation unit 13 (S4). This embodiment will exemplify a case in which an image 57 shown in FIG. 3F is generated as a reference image. However, the reference image may be, for example, an image including all the cell images divided in the processing in step S3. Alternatively, the reference image may be a single image generated by simply adding and averaging the divided cell images. Also, the average image may be generated in the sequence shown in FIG. 5. More specifically, relative position displacements in individual cell images are detected on the sub-pixel (equal to or smaller than a pixel size) precision (S41 to S43), and interpolated images are generated by interpolating the sub-pixel displacements of the respective cells using an interpolation method such as a bicubic method (S44). Then, these interpolated images are superposed each other (S45) to obtain an average image with high precision. In order to attain position alignment on the sub-pixel order, for example, matching values obtained by template matching can undergo parabola fitting. Note that an average value weighted based on a predetermined rule (for example, to strongly weight neighboring patterns) may be used as a reference image.

Referring back to FIG. 2, the pattern detection apparatus 10 compares the reference image and the object image input by the image input unit 11 by collating them with each other using the comparison unit 14 (to execute template matching of these images). Then, a spatial distribution of degrees of matching with the reference image is acquired in association with the individual patterns in the repetitive patterns (S5). The template matching can use a general normalized correlation method. With this processing, the spatial distribution of degrees of matching shown in FIG. 3G is obtained.

Figure 3H:
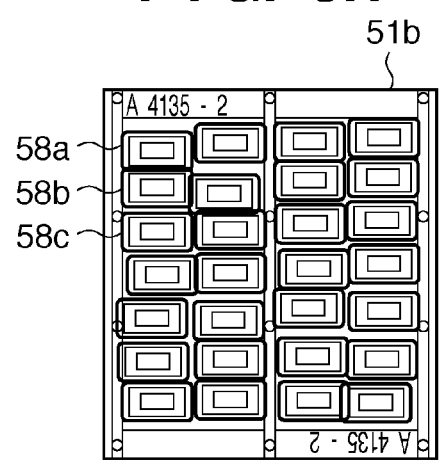

Then, the pattern detection apparatus 10 detects the positions of the individual patterns based on the spatial distribution of degrees of matching obtained by the processing in step S5 using the pattern detection unit 15 (S6). More specifically, a largest peak is selected for each cell from the spatial distribution of degrees of matching. This is determined as the position of each individual pattern in the repetitive patterns. At this time, a cell from which only a peak smaller than a predetermined threshold is obtained is not selected, and is deleted as a mismatching cell. Then, all individual patterns are detected, as shown in FIG. 3H.

The period estimation method in the period estimation unit 12 will be described below with reference to FIGS. 6A to 6C. Note that a case will be exemplified below wherein period estimation is executed using an autocorrelation function of an image.

An autocorrelation function in the x direction and that in the y direction of an image I(x, y) are defined as follows:

$$acf_x(I, u) = \frac{1}{N^2}\sum_{x=0}^{N-1}\sum_{y=0}^{N-1} I(x, y)I(x-u, y) \quad (2)$$

$$acf_y(I, v) = \frac{1}{N^2}\sum_{x=0}^{N-1}\sum_{y=0}^{N-1} I(x, y)I(x, y-v) \quad (3)$$

Figure 6A:
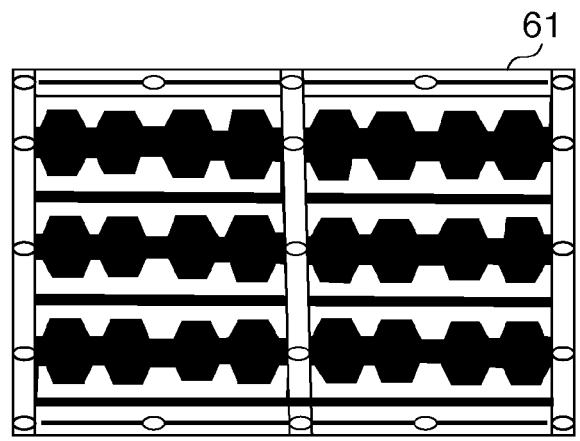
FIGS. 6A to 6C are views showing an example of an overview of a period estimation method.
Figure 6B:
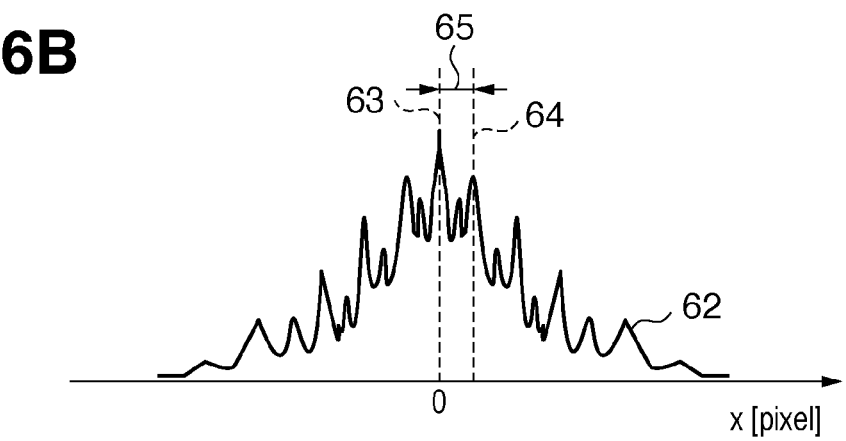
Figure 6C:
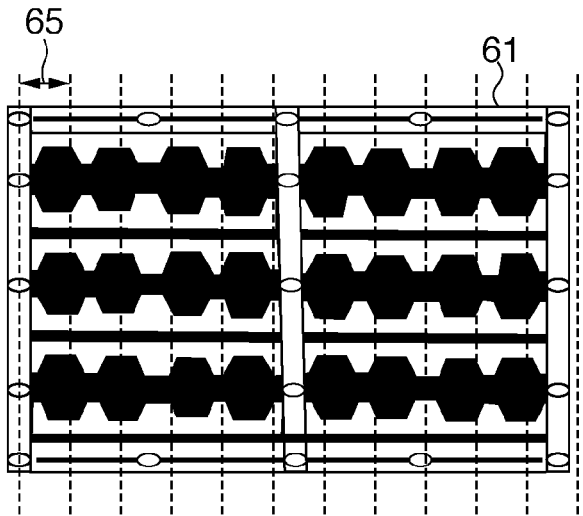
Figure 7:
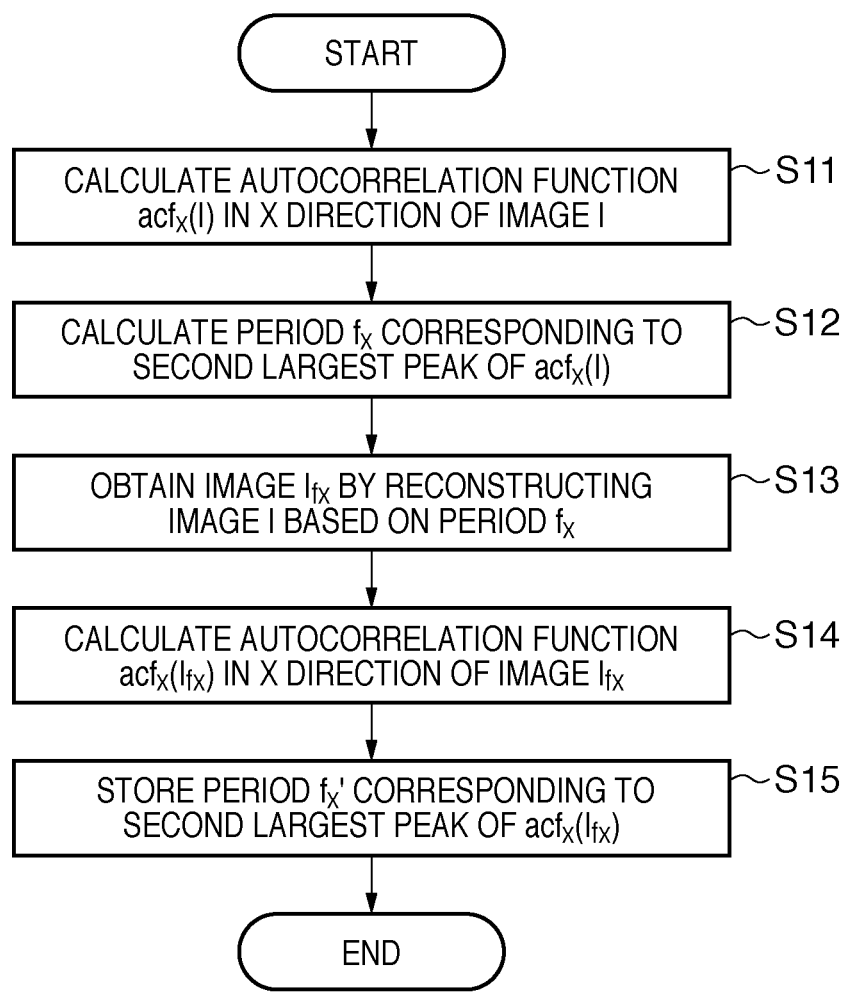
FIG. 7 is a flowchart showing an example of the sequence of processing when period estimation is executed in two stages.

FIG. 6A shows an object image 61, and FIG. 6B shows an autocorrelation function of the object image 61. In this case, the period estimation unit 12 outputs an interval 65 between a central peak 63 and second highest peak 64 in the autocorrelation function as a fundamental period. Note that when the object image includes many disturbances, unnecessary peaks are generated in the autocorrelation function, and a period may be erroneously estimated. In this case, as shown in FIG. 6C, a period shorter than a true period is unwantedly estimated. In order to avoid such situation, for example, a period may be estimated after top and bottom peaks having magnitudes equal to or smaller than a predetermined threshold of the autocorrelation function are removed. In general, an autocorrelation function of an image is calculated in association with luminance values. A period may be estimated using a plurality of autocorrelation functions in a complementary manner. Autocorrelation functions are individually calculated for images (for example, a luminance value image, a contour image using a Laplacian filter, and a corner point detection image using a Hessian matrix) obtained by a plurality of different image processes, are weighted by a predetermined value, and are then averaged. Then, using the obtained autocorrelation function according to characteristics of an image as a detection target, the period estimation precision can be improved.

Figure 8A:
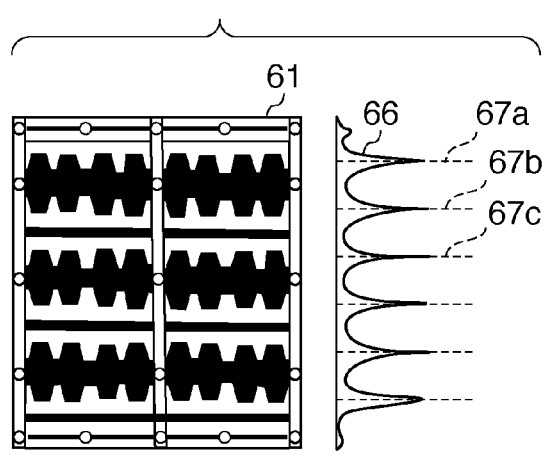
FIGS. 8A to 8G are views showing an example of an overview when period estimation is executed in two stages.
Figure 8C:
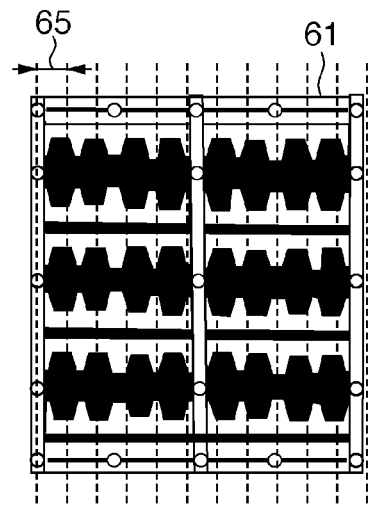
Figure 8B:
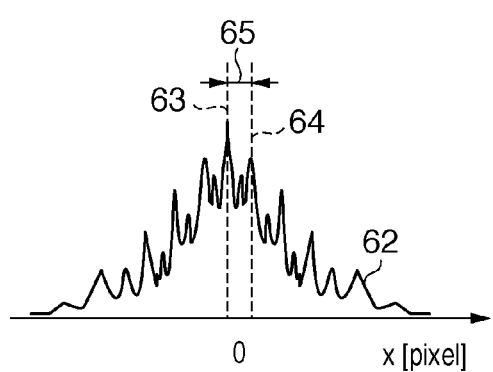

The period estimation may be executed in two stages. Processing when the period estimation is executed in two stages will be described below with reference to FIG. 7 and FIGS. 8A to 8G. In this processing, for example, as shown in FIG. 8A, a distribution A(y) 66 of powers in the y direction of frequency components is generated from those at an estimated first period $f_x$ in the x direction. In this case, A(y) is calculated by:

$$I_{f_x}(y) = \sum_{x=0}^{N-1} I(x, y)e^{-j2\pi(f_x x)/N} \quad (4)$$

$$A(y) = |I_{f_x}(y)\overline{I_{f_x}(y)}| \quad (5)$$

where $I_{f_x}$ is each frequency component at the period $f_x$ of an image I. The right-hand side of equation (5) calculates a power in the y direction by means of a product of $I_{f_x}$ and its complex conjugate. In this case, a power of $f_x$ alone is calculated, but the present invention is not limited to this. For example, the distribution A(y) of powers may be obtained using a band-pass filter having a central frequency=$f_x$ and a width=$\Delta f$.

Figure 8D:
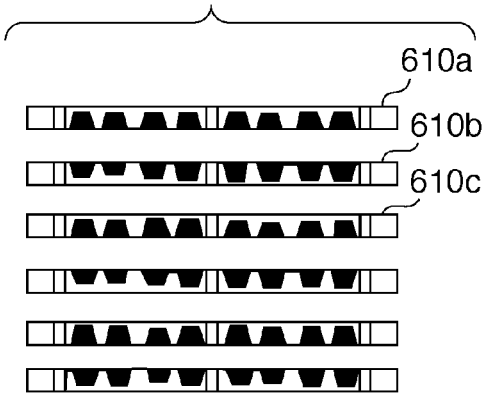

Then, the period estimation unit 12 detects peaks 67 (peaks 67a to 67c) larger than a predetermined threshold from A(y), as shown in FIG. 8A. Then, images near the positions of the detected peaks are extracted. Then, as shown in FIG. 8D, a plurality of images 610 (for example, images 610a to 610c) divided in the row direction are obtained.

Figure 8E:
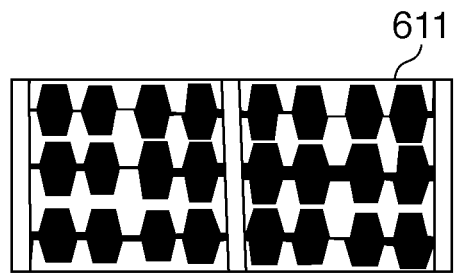
Figure 8F:
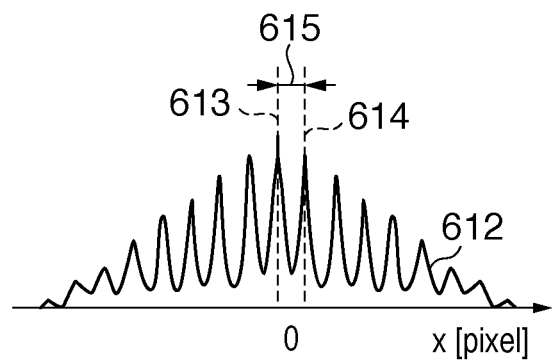
Figure 8G:
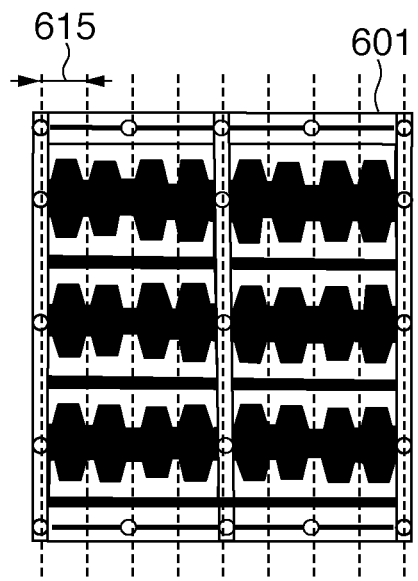

After that, the period estimation unit 12 couples the plurality of images 610 again to generate a reconstructed image 611 shown in FIG. 8E (S11 to S13). The reconstructed image 611 is configured by only regions including many first estimated frequency components. When an autocorrelation function is calculated for the reconstructed image 611 again, an autocorrelation function 612 which suffers less noise is obtained, as shown in FIG. 8F. In this case, the period estimation unit 12 outputs an interval 615 between a central peak 613 and second highest peak 614 in the autocorrelation function 612 as a fundamental period (S14 and S15). Note that if a period of patterns is given as a rough value to some extent, a reconstructed image may be generated in the aforementioned sequence using that value as the first period, and a precise period may be detected in processing of the second stage.

Figure 9:
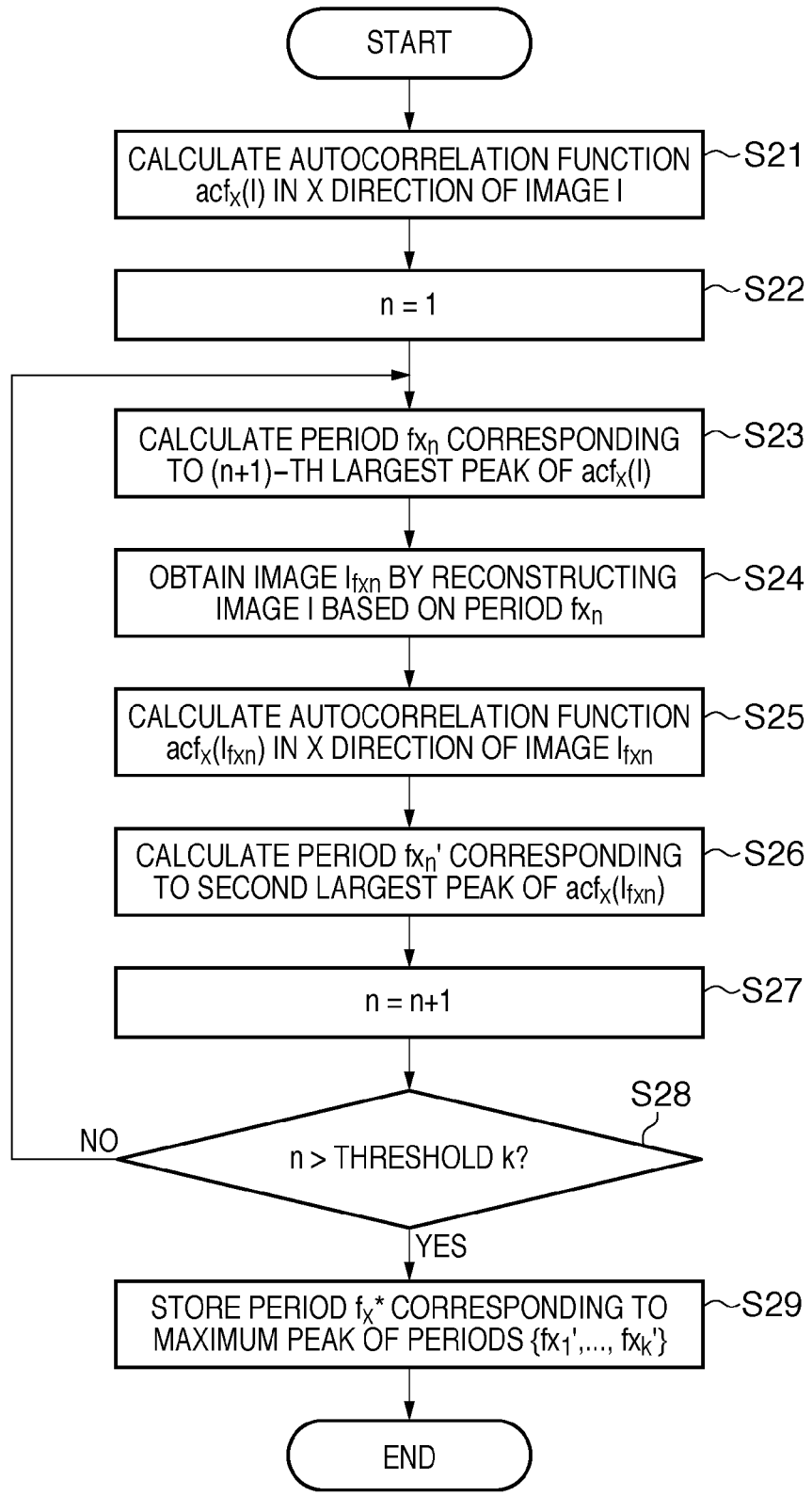
FIG. 9 is a flowchart showing an example of the sequence of processing of a modification of the period estimation method.

A period estimation method that can further enhance certainty will be briefly described below with reference to FIG. 9. In this processing, an autocorrelation function of an image I is calculated (S21), and k peaks of the autocorrelation function are extracted in descending order of height (S22 and S23). Note that since the autocorrelation function is an even function, target peaks are limited to those in positive quadrants. Then, an image is reconstructed using periods corresponding to respective peaks in the same manner as described above (S24), and a period is estimated again (S25 and S26). Then, a peak having a maximum height is selected from the k peaks obtained in this way, and is determined as an estimated period (S27 to S29).

Note that a fundamental frequency may be calculated from a power spectrum by Fourier transformation. However, wavelengths corresponding to a period of a spectrum calculated by discrete Fourier transformation assume discrete values (N/2, N/3, N/4, . . . , 2) obtained by dividing an image length by integers. For this reason, when patterns are repeated insufficiently, a period of patterns may fail to be calculated precisely. If continuous Fourier transformation is used, this problem is not posed, but a large computation volume is required. By contrast, in the method of estimating a period based on peaks of an autocorrelation function, values that wavelengths can assume are continuous integers (2, 3, 4, . . . , N). For this reason, the method using the autocorrelation function is effective in this embodiment.

As described above, according to the first embodiment, a period of repetitive patterns is estimated from an object image, and a reference image is generated based on the estimated period. Then, the reference image and object image are compared, and the positions of individual patterns included in the repetitive patterns are detected based on the comparison result. Then, even in an image of an object including fluctuations in periods of repetitive patterns or an object including disturbances that are not related to the repetitive patterns, the positions of individual patterns in the repetitive patterns can be precisely detected.

Second Embodiment

The second embodiment will be described below. The second embodiment will exemplify a case in which a non-periodic pattern is further detected in addition to the first embodiment. FIG. 10 is a block diagram showing an example of the functional arrangement of a pattern detection apparatus 10 according to the second embodiment.

The pattern detection apparatus 10 includes a non-periodic pattern detection unit 16 in addition to the arrangement of the first embodiment. Note that units denoted by the same reference numerals as those in FIG. 1 used to explain the first embodiment have the same functions, and a description thereof will not be repeated.

The non-periodic pattern detection unit 16 excludes repetitive patterns from an object image, and extracts a non-periodic pattern. As an exclusion method of repetitive patterns, for example, (1) the positions of a reference image and object image are aligned using a phase-only correlation method, and differences between images are calculated. (2) Then, pixels having difference values equal to or larger than a threshold are detected as non-periodic components.

Figure 11:
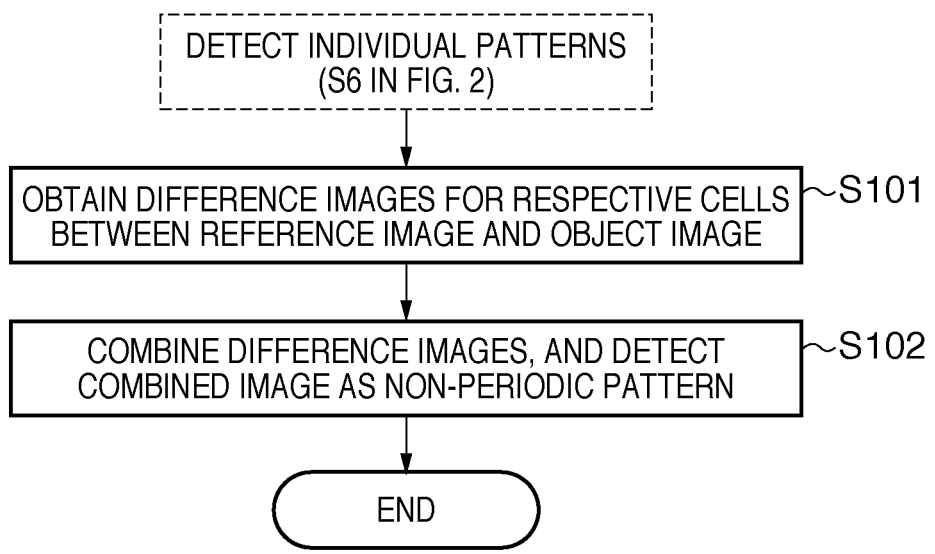
FIG. 11 is a flowchart showing an example of the sequence of processing when a non-periodic pattern is detected.

In this case, when individual patterns are detected by a pattern detection unit 15 in the processing in step S6 in FIG. 2 described above, the non-periodic pattern detection unit 16 executes processing shown in FIG. 11. That is, the non-periodic pattern detection unit 16 calculates difference images for respective cells between a reference image and object image (S101). Then, the unit 16 combines the calculated difference images, and detects the combined image as a non-periodic pattern (S102).

Note that the non-periodic pattern detection method is not limited to this. For example, a region where repetitive patterns are detected may be filled with an image average value, and the remaining image may be detected as non-periodic components (non-periodic pattern).

Figure 12:
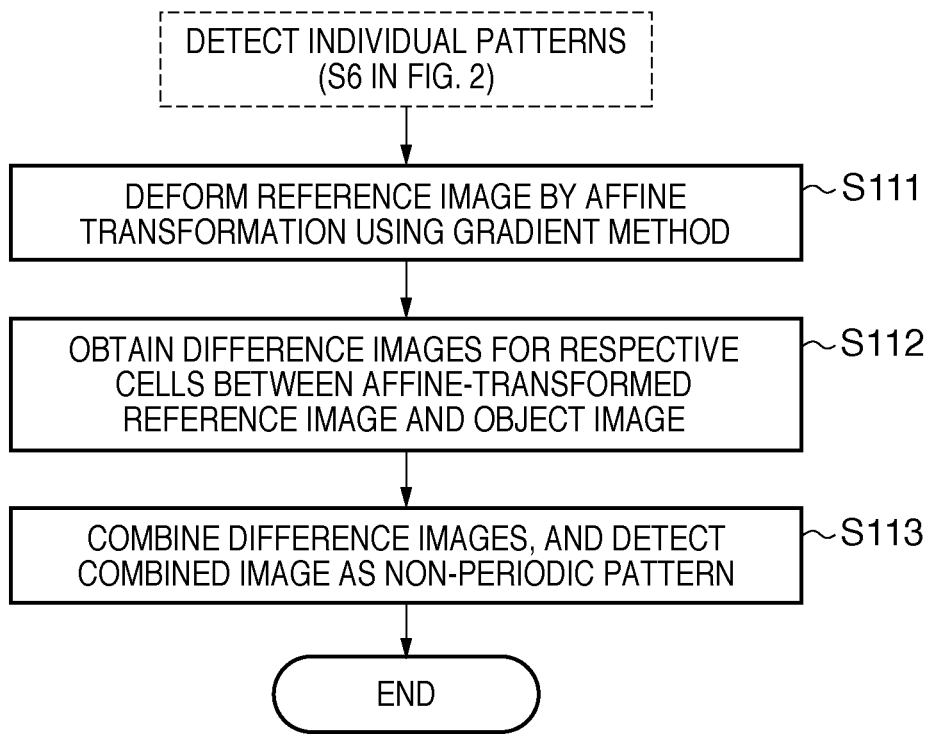
FIG. 12 is a flowchart showing an example of the sequence of processing when a non-periodic pattern is detected.

In case of the aforementioned processing shown in FIG. 11, if individual patterns include local deformations or tilts, a simple difference operation may detect portions which do not match the reference image as non-periodic components. In order to prevent this, as shown in FIG. 12, upon aligning the positions of the reference image and each individual pattern, each individual pattern may fit to the reference image while deforming the reference image (S111). More specifically, the reference image is gradually affine-deformed by iterative calculations such as a gradient method to adaptively match a rotation and shear deformation. Then, difference images for respective cells between the affine-transformed reference image and object image are calculated (S112) and are combined, and the combined image is detected as a non-periodic pattern (S113).

As described above, according to the second embodiment, repetitive patterns and non-periodic components in the object image can be separated and extracted more robustly with respect to disturbances in addition to the first embodiment.

Third Embodiment

Figure 13:
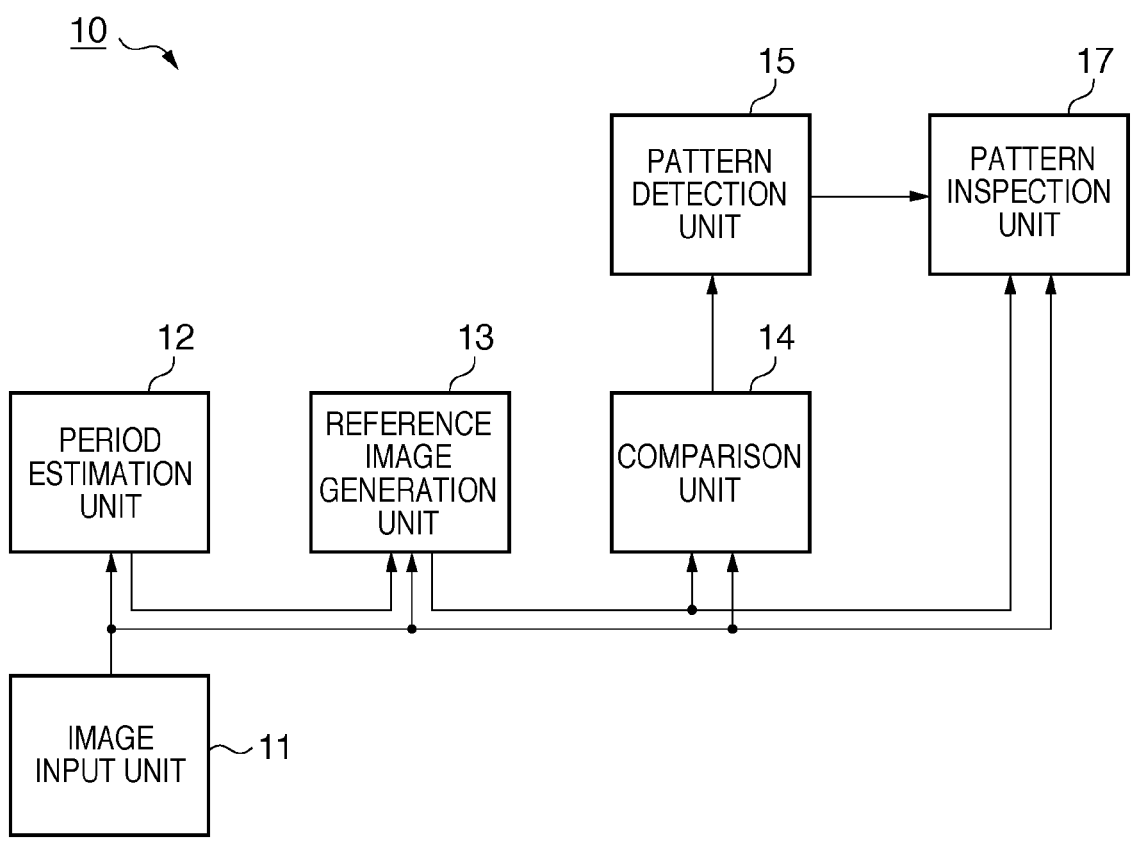
FIG. 13 is a block diagram showing an example of the functional arrangement of a pattern detection apparatus 10 according to the third embodiment.

The third embodiment will be described below. The third embodiment will exemplify a case in which pattern inspection is further executed in addition to the first embodiment. FIG. 13 is a block diagram showing an example of the functional arrangement of a pattern detection apparatus 10 according to the third embodiment.

The pattern detection apparatus 10 includes a pattern inspection unit 17 in addition to the arrangement of the first embodiment. Note that units denoted by the same reference numerals as those in FIG. 1 used to explain the first embodiment have the same functions, and a description thereof will not be repeated.

The pattern inspection unit 17 inspects defects of repetitive patterns detected from an object image. More specifically, in the processing in step S6 in FIG. 2 described above, a pattern detection unit 15 selects a largest peak for each cell from a spatial distribution of degrees of matching, so as to detect a position of each pattern. At this time, the pattern inspection unit 17 detects that a cell (pattern) from which only a peak smaller than a predetermined threshold is obtained includes an external defect.

Note that the pattern inspection method is not limited to this. For example, pixels where absolute values of differences between regions of individual patterns detected by the pattern detection unit 15 and the reference image are larger than a predetermined threshold are counted. When a ratio of counted pixels is equal to or larger than a predetermined threshold, it may be detected that the pattern region includes a defect.

For example, the presence/absence of a defect may be detected based on comparison between the position of each individual pattern detected by the pattern detection unit 15 and the central position (predetermined reference position) of each cell. That is, when a value obtained as a result of the comparison is largely displaced from a predetermined value, it is detected that the pattern includes a defect (positional displacement).

As described above, according to the third embodiment, defects in repetitive patterns can be inspected more robustly with respect to disturbances in addition to the first embodiment.

Examples of the representative embodiments of the present invention have been described. However, the present invention is not limited to the aforementioned and illustrated embodiments, and can be modified as needed within a range without changing its gist. For example, the aforementioned first to third embodiments may be combined.

Note that the present invention can adopt embodiments in the forms of, for example, a system, apparatus, method, program, or storage medium. More specifically, the present invention may be applied to either a system including a plurality of devices or an apparatus including a single device.

First Modified Embodiment

In the above description, a spatial distribution of degrees of matching of individual patterns is acquired by executing template matching in a comparison unit 14. However, this processing may be attained by a method other than template matching. For example, matching may be implemented using a phase-only correlation method. The phase-only correlation method is a comparison method limited to only phase components of frequency components of a signal.

Mathematical details of the phase-only correlation method will be described below. The phase-only correlation method used in this embodiment is a method related to a normalized correlation method which is generally used as a template matching method. In the phase-only correlation method, comparison of degrees of matching and position alignment between images are executed using only phase components by excluding energy components of the frequency components of an image signal. The phase-only correlation method is suitable for precise position alignment between patterns each of which is formed of a contour, since it evaluates degrees of matching by susceptibly responding to the abrupt leading and trailing edges of a signal.

Discrete Fourier transforms $G(u, v)$ and $H(u, v)$ of images $g(x, y)$ and $h(x, y)$ are respectively given by:

$$G(u, v) = \sum_{x=0}^{N-1}\sum_{y=0}^{N-1} g(x, y)e^{-j2\pi(ux+vy)/N} \quad (6)$$

$$H(u, v) = \sum_{x=0}^{N-1}\sum_{y=0}^{N-1} h(x, y)e^{-j2\pi(ux+vy)/N} \quad (7)$$

Furthermore, a spatial distribution r(x, y) of spaces of degrees of matching limited to phases of the images g and h is defined using complex conjugates of G(u, v) and H(u, v), a Fourier transform R(u, v) of r(x, y), and an inverse discrete Fourier transform by:

$$R(u, v) = \frac{G(u, v)\overline{H(u, v)}}{|G(u, v)\overline{H(u, v)}|} \quad (8)$$

$$r(x, y) = \frac{1}{N^2}\sum_{u=0}^{N-1}\sum_{v=0}^{N-1} R(u, v)e^{-j2\pi(ux+vy)/N} \quad (9)$$

In this case, the denominator of the right-hand side of equation (8) represents a power spectrum of a signal, and all intensities of respective frequency components of the signal are normalized to "1". A position (x*, y*) of a maximum peak in the spatial distribution r(x, y) of degrees of matching indicates a position on a space where the images g and h match best. A magnitude r*=r(x*, y*) of the peak represents that of a degree of matching between g and h.

Second Modified Embodiment

Figure 14A:
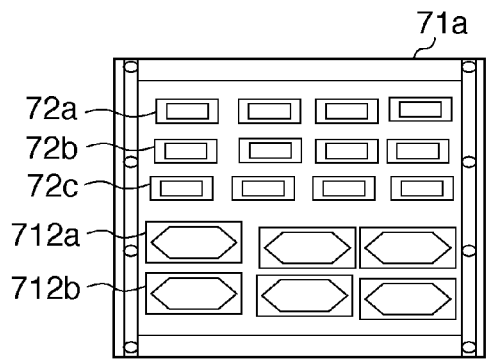
FIGS. 14A to 14F are views showing an example of an overview of a modified embodiment.
Figure 14D:
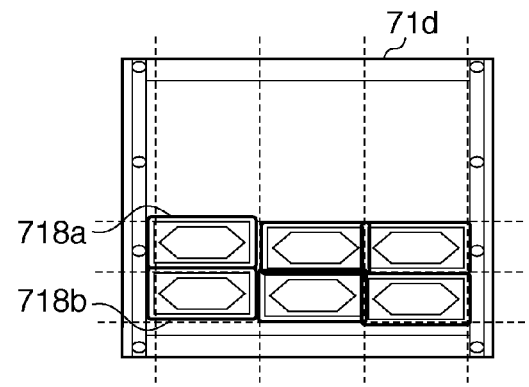
Figure 14B:
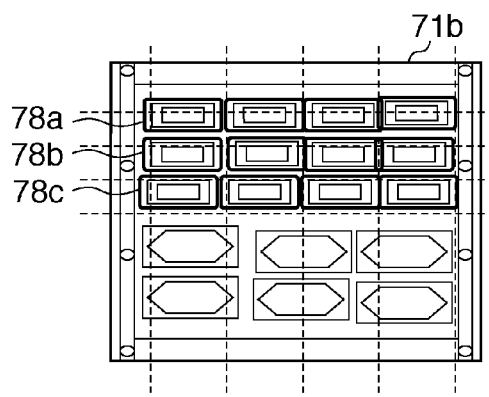
Figure 14E:
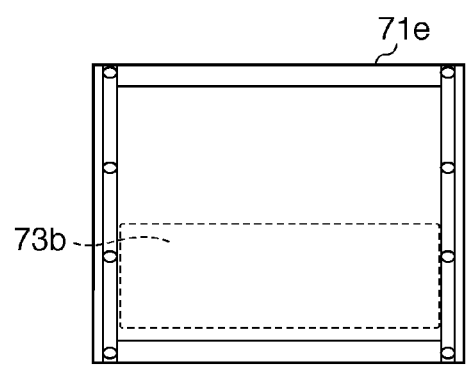
Figure 14C:
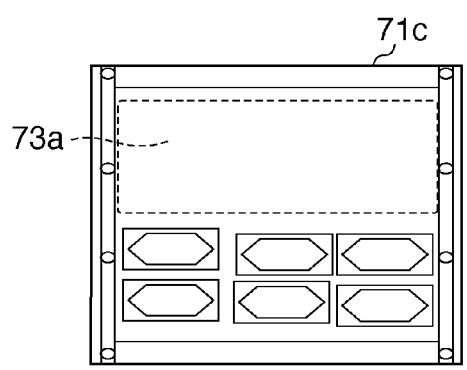
Figure 14F:
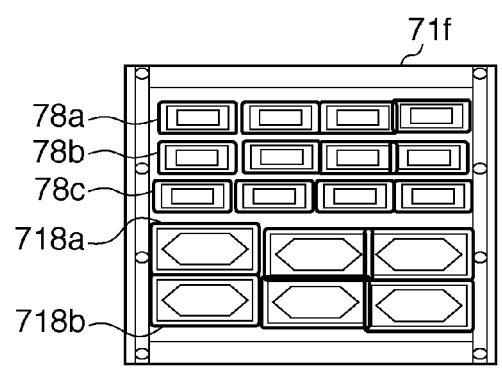

In the above description, an image on which repetitive patterns to be detected are arranged two-dimensionally, that is, in the row and column directions have been exemplified. However, the present invention is not limited to this. For example, an image on which patterns are arranged in only one of the row and column directions or an image on which patterns in one of the row and column directions have no periodicity may be used. Also, for example, an image may include repetitive patterns having a plurality of different periods, as shown in FIG. 14A. In this case, as shown in FIG. 15, pattern detection processing of the first stage is executed (S61 to S63). Then, after detected patterns are stored, a region 73a of the detected patterns is removed by filling it with an average luminance of an object image (S64), as shown in FIG. 14C. If a remaining region is equal to or larger than a threshold, repetitive patterns are detected again (S65). Then, an image region 73b where patterns are detected is similarly removed (S61 to S64). As a result of recursively repeating such pattern detection processing, if any effective repetition period ceases to be detected (NO in step S62), this processing ends. Note that a state in which no effective repetition period is detected includes, for example, a case in which the height of the second highest peak of the autocorrelation function becomes equal to or smaller than a predetermined threshold, a case in which the estimated period falls outside a predetermined adequate range, or a case in which an area of the remaining image region becomes equal to or smaller than a predetermined ratio.

Figure 16A:
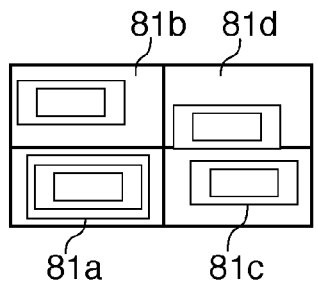
FIGS. 16A to 16D are views showing an example of an overview of the modified embodiment.
Figure 16B:
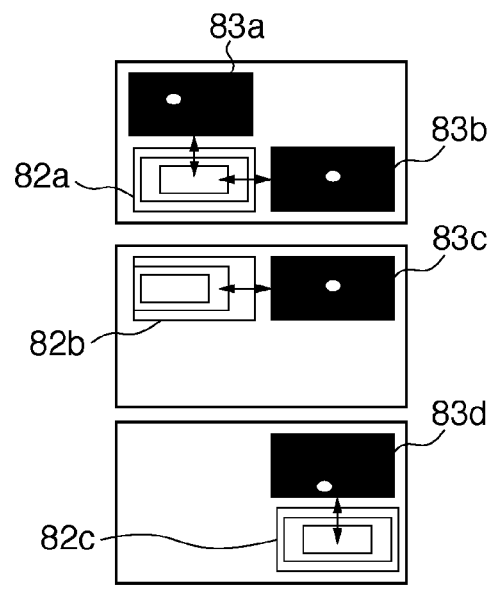
Figure 16C:
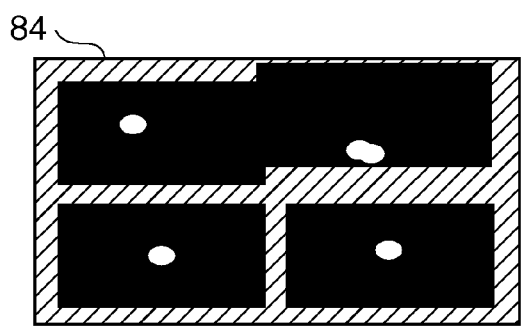
Figure 16D:
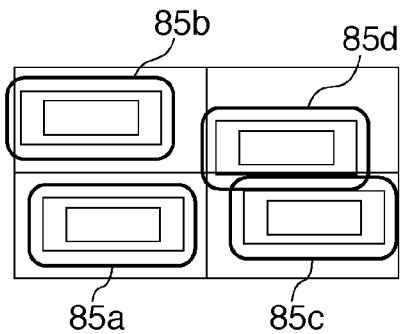

In the above description, the case in which an average image is used as a reference image has been emphasized. For example, an image of a neighboring cell may be used as a reference image. More specifically, as shown in FIG. 16A, individual divided cells 81a to 81d are used as templates, and undergo template matching with their neighboring cells 81a to 81d. Then, spatial distributions 83a to 83d of degrees of matching with neighboring cells are obtained. These are a set of fragmentary pattern arrangements. Next, a reference cell (cell 81a in this case) is decided, and local spatial distributions are coupled to obtain a spatial distribution 84 of degrees of matching of patterns defined by the overall image (FIG. 16C). More specifically, a templates 82a is compared with the cell 81b, and a maximum peak in the distribution 83a of degrees of matching obtained as a result of comparison is calculated (a blank circle in the distribution 83a). A displacement amount of the maximum peak from the center of the distribution 83a is stored. Then, a template 82b is compared with the cell 81d, and the spatial distribution 83c of degrees of matching obtained as a result of comparison is displaced by the displacement amount to be coupled to the distribution 83a. Such processing is repeated between all the neighboring cells. In this way, the distribution 84 of degrees of matching obtained by coupling all the regions of the image is obtained (FIG. 16C). In this way, the spatial distribution of all patterns can also be estimated from only local comparisons without using any average image. This method has an advantage that patterns can be detected and inspected without being influenced by slow changes such as shading and pattern shape changes that appear in the entire image.

According to the present invention, even in an image of an object including fluctuations in periods of repetitive patterns or an object including disturbances which are not related to the repetitive patterns, the positions of individual patterns in the repetitive patterns can be precisely detected.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-223461 filed on Sep. 28, 2009, which is hereby incorporated by reference herein in its entirety.

What is claimed is:

1. A pattern detection apparatus comprising:
an input unit configured to input an image of an object including repetitive patterns;
an estimation unit configured to estimate a period of the repetitive patterns in the object input by said input unit;
a division unit configured to divide the image into divided images based on the period estimated by said estimation unit;
a correction unit configured to correct a dividing position of the divided images with respect to a position of the patterns;

a generation unit configured to generate a reference image based on the divided images corrected with respect to the position of the patterns;

a comparison unit configured to compare the reference image generated by said generation unit and the image of the object input by said input unit; and a pattern detection unit configured to detect positions of individual patterns in the repetitive patterns based on a comparison result of said comparison unit.

2. The apparatus according to claim 1, further comprising a non-periodic pattern detection unit configured to detect a non-periodic pattern in the object by excluding the individual patterns detected by said pattern detection unit from the image of the object.

3. The apparatus according to claim 1, further comprising a pattern inspection unit configured to inspect the presence/absence of defects for the individual patterns detected by said pattern detection unit.

4. The apparatus according to claim 3, wherein said pattern inspection unit inspects the presence/absence of external defects of the patterns based on comparison between the reference image and the individual patterns detected by said pattern detection unit.

5. The apparatus according to claim 3, wherein said pattern inspection unit inspects the presence/absence of defects of positional displacements of the patterns based on comparison between the positions of the individual patterns detected by said pattern detection unit and predetermined reference positions.

6. The apparatus according to claim 1, wherein said estimation unit estimates the period of the repetitive patterns, reconstructs an image of the object using a region including the repetitive patterns detected based on the estimated period, and estimates a period from the reconstructed image of the object again.

7. The apparatus according to claim 1, wherein said estimation unit calculates an autocorrelation function for the image of the object, and estimates the period based on the autocorrelation function.

8. The apparatus according to claim 1, wherein said estimation unit calculates a plurality of autocorrelation functions for a plurality of images obtained by applying a plurality of different image processes to the image of the object, and estimates the period based on the plurality of autocorrelation functions.

9. The apparatus according to claim 1, wherein said comparison unit uses only phase components of frequency components of the image of the object upon execution of the comparison.

10. The apparatus according to claim 1, wherein said pattern detection unit removes, from the image, a region where the detected individual patterns are located, and recursively detects the patterns from a remaining image.

11. The apparatus according to claim 1, wherein the repetitive patterns include at least either of fluctuations and disturbances which are not related to the repetitive patterns in repetition periods, and the number of repetitive patterns and a pattern shape are unknown.

12. A processing method of a pattern detection apparatus, comprising:

an inputting step of inputting an image of an object including repetitive patterns;

an estimating step of estimating a period of the repetitive patterns in the input object;

a division step of dividing the image into divided images based on the period estimated in the estimation step;

a correction step of correcting a dividing position of the divided images with respect to a position of the patterns;

a generating step of generating a reference image based on the divided images corrected with respect to the position of the patterns;

a comparing step of comparing the generated reference image and the image of the input object; and a detecting step of detecting positions of individual patterns in the repetitive patterns based on a result in the comparing step.

13. A computer-readable storage medium storing a computer program, the program controlling a computer to function as:

an input unit configured to input an image of an object including repetitive patterns;

an estimation unit configured to estimate a period of the repetitive patterns in the object input by said input unit;

a division unit configured to divide the image into divided images based on the period estimated by said estimation unit;

a correction unit configured to correct a dividing position of the divided images with respect to a position of the patterns;

a generation unit configured to generate a reference image based on the divided images corrected with respect to the position of the patterns;

a comparison unit configured to compare the reference image generated by said generation unit and the image of the object input by said input unit; and a pattern detection unit configured to detect positions of individual patterns in the repetitive patterns based on a comparison result of said comparison unit.

14. A pattern detection apparatus comprising:

an input unit configured to input an image of an object including repetitive patterns;

an estimation unit configured to estimate a period of the repetitive patterns in the object input by said input unit;

a generation unit configured to generate a reference image based on images divided by the period estimated by said estimation unit;

a comparison unit configured to compare the reference image generated by said generation unit and the image of the object input by said input unit; and a pattern detection unit configured to detect positions of individual patterns in the repetitive patterns based on a comparison result of said comparison unit, wherein the period of the repetitive patterns includes at least either of fluctuations or disturbances which are not related to the repetitive patterns.

15. A pattern detection apparatus comprising:

an input unit configured to input an image of an object including repetitive patterns;

an estimation unit configured to estimate a period of the repetitive patterns in the object input by said input unit;

a generation unit configured to generate a reference image based on images divided by the period estimated by said estimation unit;

a comparison unit configured to compare the reference image generated by said generation unit and the image of the object input by said input unit; and a pattern detection unit configured to detect positions of individual patterns in the repetitive patterns based on a comparison result of said comparison unit, wherein said generation unit divides the image into rows and columns based on the period estimated by said estimation unit, and generates images of a plurality of partitions obtained by the division as the reference image, and wherein said comparison unit executes the comparison by collating the reference image generated by said generation unit and the images of the plurality of partitions with each other.

16. A pattern detection apparatus comprising:

an input unit configured to input an image of an object including repetitive patterns;

an estimation unit configured to estimate a period of the repetitive patterns in the object input by said input unit;

a generation unit configured to generate a reference image based on images divided by the period estimated by said estimation unit;

a comparison unit configured to compare the reference image generated by said generation unit and the image of the object input by said input unit; and a pattern detection unit configured to detect positions of individual patterns in the repetitive patterns based on a comparison result of said comparison unit, wherein said generation unit divides the image into rows and columns based on the period estimated by said estimation unit, and generates an image obtained by averaging images of a plurality of partitions obtained by the division as the reference image, and wherein said comparison unit executes the comparison by collating the reference image generated by said generation unit and the images of the plurality of partitions with each other.

17. A pattern detection apparatus comprising:

an input unit configured to input an image of an object including repetitive patterns;

an estimation unit configured to estimate a period of the repetitive patterns in the object input by said input unit;

a generation unit configured to generate a reference image based on images divided by the period estimated by said estimation unit;

a comparison unit configured to compare the reference image generated by said generation unit and the image of the object input by said input unit; and a pattern detection unit configured to detect positions of individual patterns in the repetitive patterns based on a comparison result of said comparison unit, wherein said generation unit divides the image into rows and columns based on the period estimated by said estimation unit, and generates an image obtained by weighting images of a plurality of partitions obtained by the division based on a predetermined rule and averaging the weighted images as the reference image, and wherein said comparison unit executes the comparison by collating the reference image generated by said generation unit and the images of the plurality of partitions with each other.

18. A pattern detection apparatus comprising:

an input unit configured to input an image of an object including repetitive patterns;

an estimation unit configured to estimate a period of the repetitive patterns in the object input by said input unit;

a generation unit configured to generate a reference image based on images divided by the period estimated by said estimation unit;

a comparison unit configured to compare the reference image generated by said generation unit and the image of the object input by said input unit; and a pattern detection unit configured to detect positions of individual patterns in the repetitive patterns based on a comparison result of said comparison unit, wherein said generation unit divides the image into rows and columns based on the period estimated by said estimation unit, and generates an image obtained by aligning positions of images of a plurality of partitions obtained by the division and averaging the aligned images as the reference image, and wherein said comparison unit executes the comparison by collating the reference image generated by said generation unit and the images of the plurality of partitions with each other.

19. The apparatus according to claim 18, wherein said generation unit executes the position alignment on a precision not more than a pixel size.

* * * * *